(12) United States Patent
Morgan

(10) Patent No.: US 6,729,479 B2
(45) Date of Patent: May 4, 2004

(54) WIRE STORAGE DEVICE

(76) Inventor: Fletcher Morgan, 4990 Coquina Key Dr. SE., St. Petersburg, FL (US) 33705

( * ) Notice: Subject to any disclaimer, the term of this patent is extended or adjusted under 35 U.S.C. 154(b) by 0 days.

(21) Appl. No.: 10/309,098

(22) Filed: Dec. 4, 2002

(65) Prior Publication Data

US 2004/0007545 A1 Jan. 15, 2004

Related U.S. Application Data

(63) Continuation-in-part of application No. 10/194,275, filed on Jul. 15, 2002, and a continuation-in-part of application No. 10/194,283, filed on Jul. 15, 2002, and a continuation-in-part of application No. 10/194,287, filed on Jul. 15, 2002.

(51) Int. Cl.⁷ ............................................... A47G 19/08
(52) U.S. Cl. .................................................. 211/41.11
(58) Field of Search ........................... 211/41.11, 41.3, 211/41.1, 41.2, 40; D6/462

(56) References Cited

U.S. PATENT DOCUMENTS

| | | | | |
|---|---|---|---|---|
| 27,603 A | * | 3/1860 | Scott | |
| 1,842,118 A | * | 1/1932 | Resnik et al. | 211/41.11 |
| 2,972,414 A | * | 2/1961 | Sipe | 211/41.11 |
| D320,332 S | * | 10/1991 | Fetty | D7/638 |
| 5,396,993 A | * | 3/1995 | Spitler | 211/41.2 |
| D380,638 S | * | 7/1997 | Cohen et al. | D6/566 |
| 5,683,010 A | * | 11/1997 | Boyajian, Jr. | 220/744 |
| D418,693 S | * | 1/2000 | Kopala, Jr. | D6/462 |
| 6,012,593 A | * | 1/2000 | Knittel et al. | 211/41.11 |

* cited by examiner

Primary Examiner—Alvin Chin-Shue
Assistant Examiner—Sarah Purol
(74) Attorney, Agent, or Firm—John S. Hale; Gipple & Hale

(57) ABSTRACT

A wire storage rack comprising an adjustable plastic coated wire rack which can be mounted on any planar base. The wire rack has side posts provided with a threaded end and an upper offset end. A "U" shaped cross piece connects the side posts. The cross piece has transverse legs which are secured to a respective side post and extend outward therefrom with the portion of the leg adjacent to the "U" shaped portion forming a curved indentation which serves as a lid seat. The "U" shaped portion is curved backward toward the side posts past the lid seat to securely hold a lid placed therein in place.

21 Claims, 5 Drawing Sheets

WIRE STORAGE DEVICE

CROSS-REFERENCE TO RELATED APPLICATIONS

There is a continuation-in-part application of U.S. Design patent application Ser. No. 29/170,482, filed Nov. 7, 2002; U.S. patent application Ser. No. 10/194,275, filed Jul. 15, 2002; U.S. patent application Ser. No. 10/194,283, filed Jul. 15, 2002; U.S. patent application Ser. No. 10/194,287, filed Jul. 15, 2002.

TECHNICAL FIELD OF THE INVENTION

The present invention generally relates to a storage rack unit and more specifically is directed toward a wire storage rack unit which can be mounted into a cabinet or any flat planar surface for holding the lids of cooking pots, pans and skillets.

BACKGROUND OF THE PRIOR ART

Most cooks have accumulated a collection of covered cookware that range over many sizes of pots and pans and containers with lids. Even those persons who do not consider themselves as real cooks have an assortment of lids for the various containers in which they cook food, both on top of a stove, in a microwave and in an oven. Thus almost all kitchens contain significant numbers of pots, pans and other cooking containers and lids for same. The lids must be stored when they are not in use generally stacked one upon the other.

Where and how these cooking container lids are stored may vary substantially from kitchen to kitchen. In some instances, pots and cooking containers are stacked in a nested fashion with the largest diameter pot on the bottom and successively smaller pots on top. While this might be a relatively efficient way to store pots, pans and other cooking vessels such as casseroles, the lids and covers usually cannot be stored effectively in a nested stack. Most kitchens which use this nesting stack storage method for pots also have a disorganized pile of lids and covers. The cook then must rummage through the pile to locate the correct lid for the container he or she wants to use and move stacks of containers. In a home kitchen this exercise is very frustrating and can be quite chaotic when people and children gather in the kitchen during cooking of the meal.

Some cooks simply cover their pots and pans with the lids and store them side-by-side on cabinet shelves. Although this method allows the cook to locate the correct lid quickly, it requires significantly more storage space than stacking or nesting the containers.

The present inventive wire storage rack device is useful for holding the lids of pots, pans, skillets and containers for easy access to same. In the prior art, shaped wire stands have been used to provide open storage for related use utensils lids and other similar items.

U.S. Pat. No. 2,516,088 issued Jul. 18, 1950 is directed toward a folding dish drying rack formed from round wire stock which has a protective coating of rubber or synthetic resin. A plurality of elements are pivotally supported between an adjacent pair of longitudinal rods. Each element is mounted with a crank portion positioned outwardly and a lug portion positioned inwardly for attachment to and manipulation by a push bar. A push bar is slidably mounted in slots formed in a pair of mounting plates secured to the ends of a base.

U.S. Pat. No. 5,660,284 issued Aug. 26, 1997 is directed toward a storage rack for holding and storing cooking container lids and like shaped objects. The rack has a base with a pair of feet allowing it to be placed in a vertical or horizontal position. A plurality of adjustable crosspieces forming rests or steps are positioned at desired locations along the edges of the bracket members to hold the container lids at a storage angle.

Other commonly used types of stands are a wire rack with legs and supports such as that shown in U.S. Pat. Nos. 2,190,065, 2,891,676, 3,013,670, 3,164,108, 4,592,471, 4,756,582 and 4,943,029.

The prior art, therefore, has failed to provide a wire storage rack or holder for cooking container lids and covers that may be easily mounted in a cabinet or on any flat surface by the purchaser or by a consumer to hold and store a number of containers and lids of varying and different dimensions. Consequently, there is a need for such a holding rack in the home kitchen to allow storage areas to be organized effectively and allow easy access to the correct lid for specific cooking containers.

Accordingly, the novel wire storage rack unit has been developed to hold pot, pan, and skillet lids which resolves the problems of counter and cabinet space, cluttered storage, mislaid lids, matching lids to containers, hereby allowing lids to be consolidated and hidden from sight in a cabinet or enclosed area.

SUMMARY OF THE INVENTION

The present invention is directed toward an adjustable plastic coated wire lid storage unit comprising a wire rack which can be mounted on any planar surface. The wire rack has side posts provided with a threaded end and an upper offset end. An inverted "U" shaped cross piece with a curved base connects the side posts below the upper offset end. The cross piece has legs which are secured to the respective side post and extend transversely outward therefrom with a leg section adjacent to the "U" shaped portion forming a curved recess to seat the edge of a lid. The "U" shaped cross piece is curved backward toward the side posts to securely hold a lid placed therein in place.

It is an object of the present invention to provide a wire storage rack for cooking container covers and lids which can be easily mounted by the purchaser or consumer to a base, such as a shelf or planar platform to accommodate a specific collection of cooking containers lids with the minimum need of tools, fasteners or adhesives.

It is a further object of the present invention to provide a wire storage rack for cooking container lids that can be sized and/or spaced to hold all the lids for a selected set or brand of cookware as well as providing a contained area for the pots, pans, skillets, and cooking containers.

It is yet another object of the invention to provide a wire storage rack which can be easily mounted to a flat surface with a minimum of instructions and general lack of mechanical skill by the consumer.

It is a further object of the invention to provide a wire storage rack which may be easily and inexpensively fabricated from round; wire stock or other suitable materials having strength and durability.

It is still another object of the invention to provide a wire storage rack which is coated to protect the cooking ware and allow the,e rack to be easily cleaned.

In the accompanying drawings, there is shown illustrative embodiments of the invention from which these and other objectives, novel features and advantages will be readily apparent.

DETAILED DESCRIPTION OF THE INVENTION

The adjustable wire storage rack of the present invention is ideally suited for use in the home as it provides a compact storage rack for containers and their respective lids and covers that allows easy access to the same. The preferred embodiment of the storage rack of the present invention is designed to be easily mounted by the user on a planar base to hold a number of cooking containers and their respective lids of different sizes and diameters for easy access to same.

Figure 1:
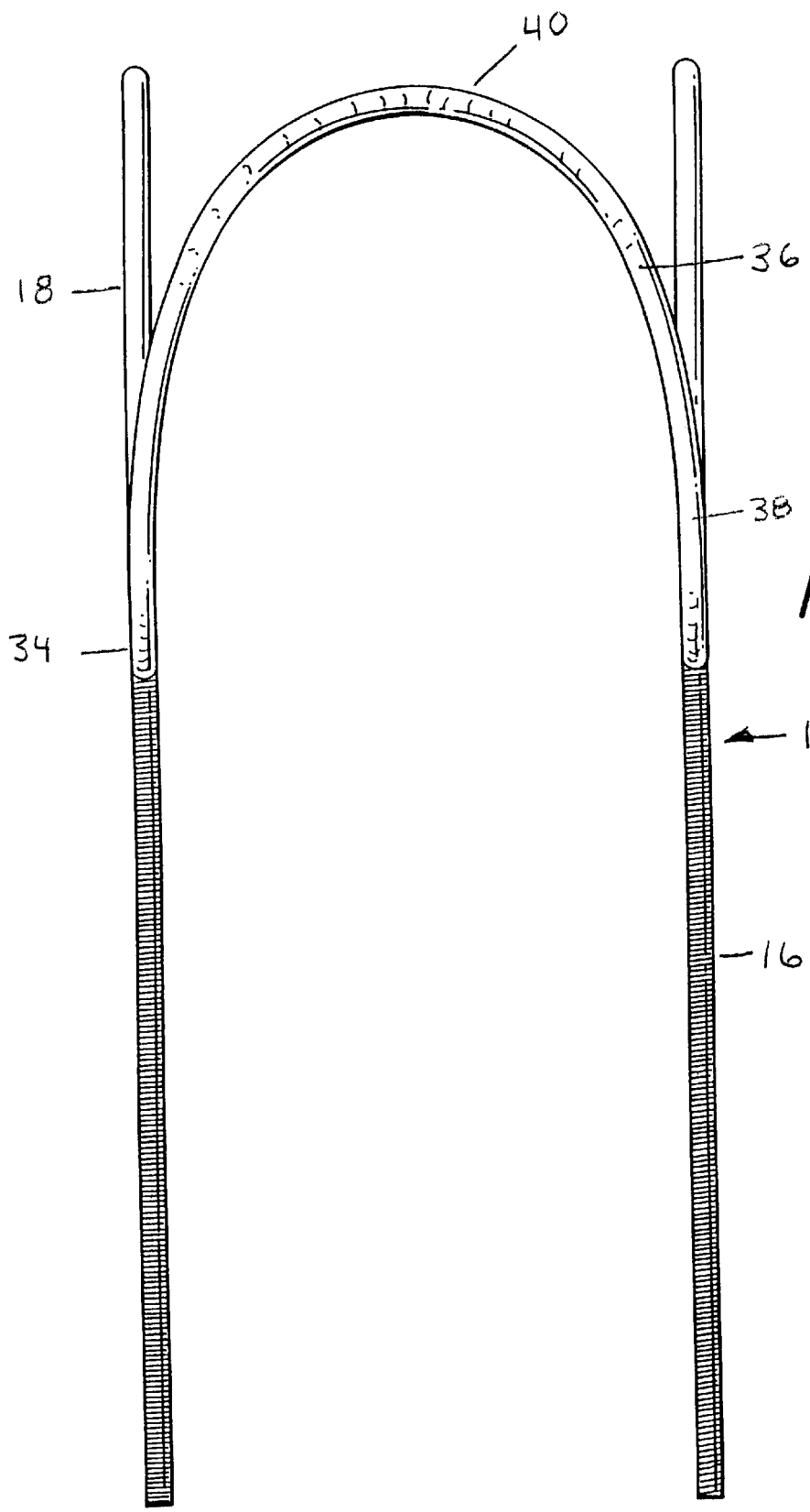
FIG. 1 is a front elevational view of the wire storage rack invention.
Figure 2:
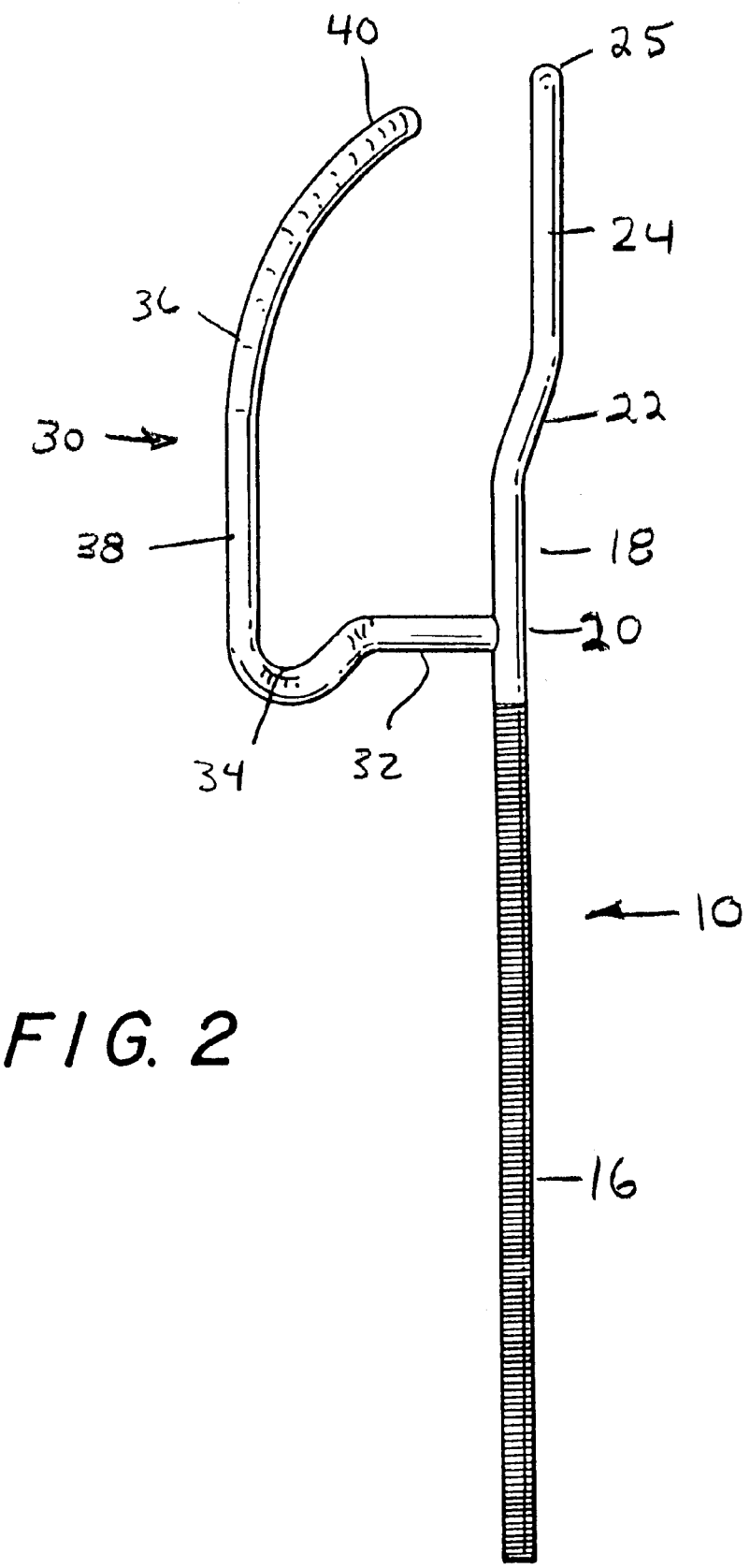
FIG. 2 is a side elevational view of the wire storage rack of FIG. 1, the opposite side being identical thereto.
Figure 3:
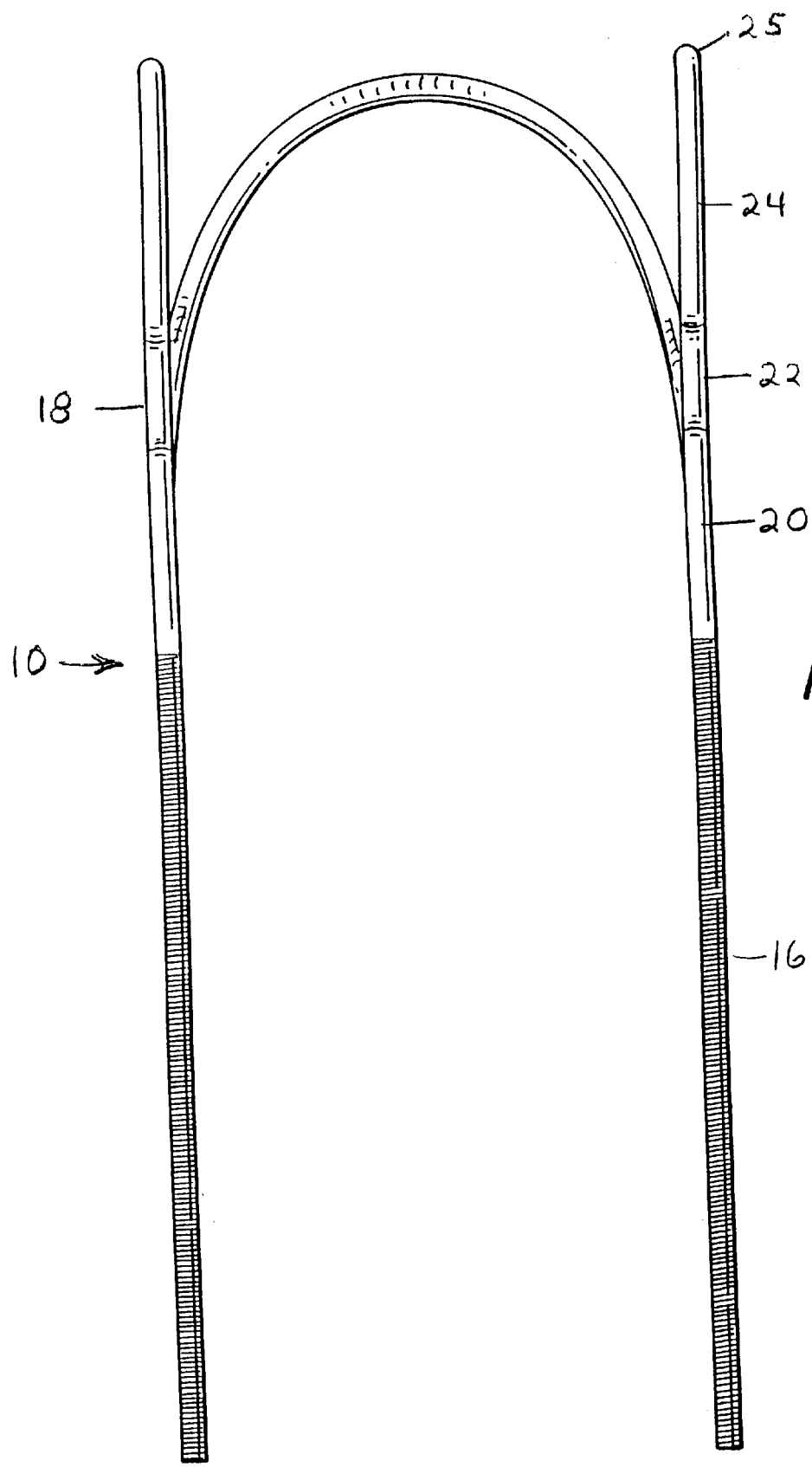
FIG. 3 is a rear elevational view of the wire storage rack of FIG. 1.
Figure 4:
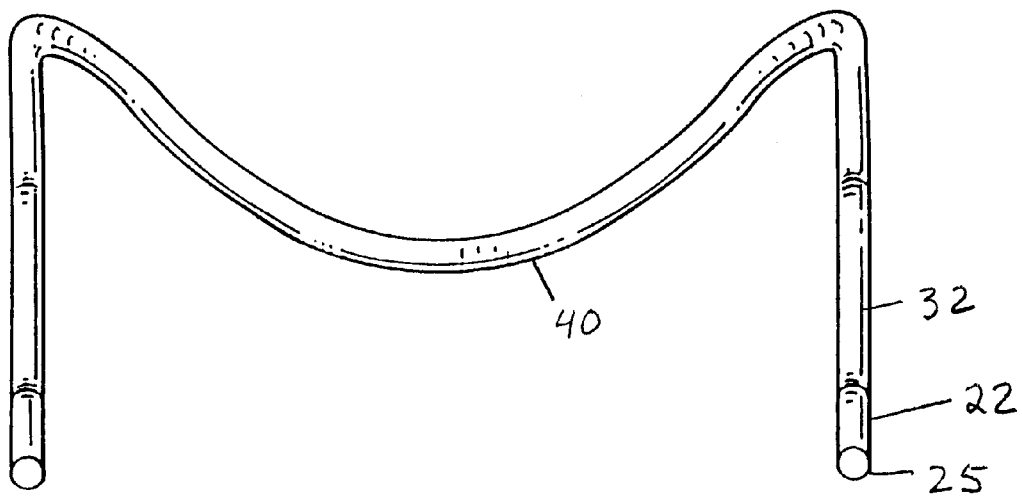
FIG. 4 is a top plan view of the wire storage rack of FIG. 1.
Figure 5:
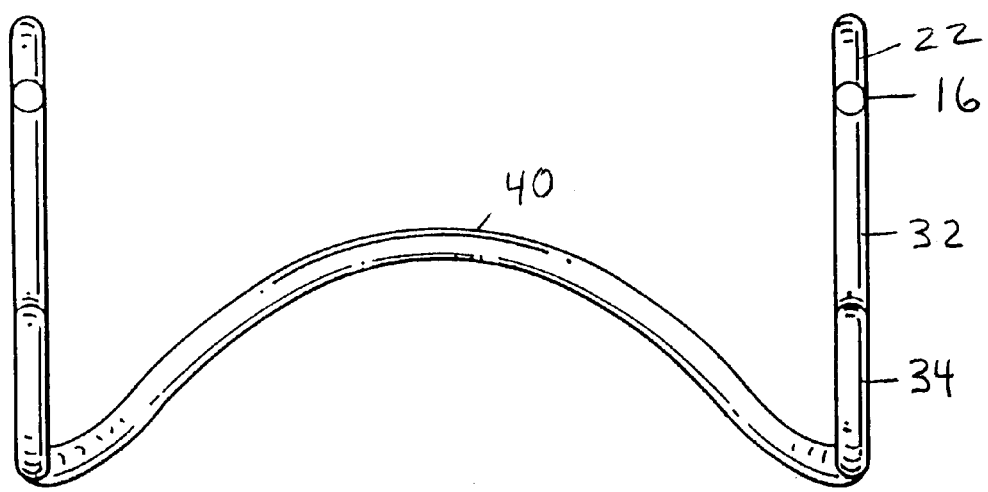
FIG. 5 is a bottom plan view of the lid holder of FIG. 1.
Figure 6:
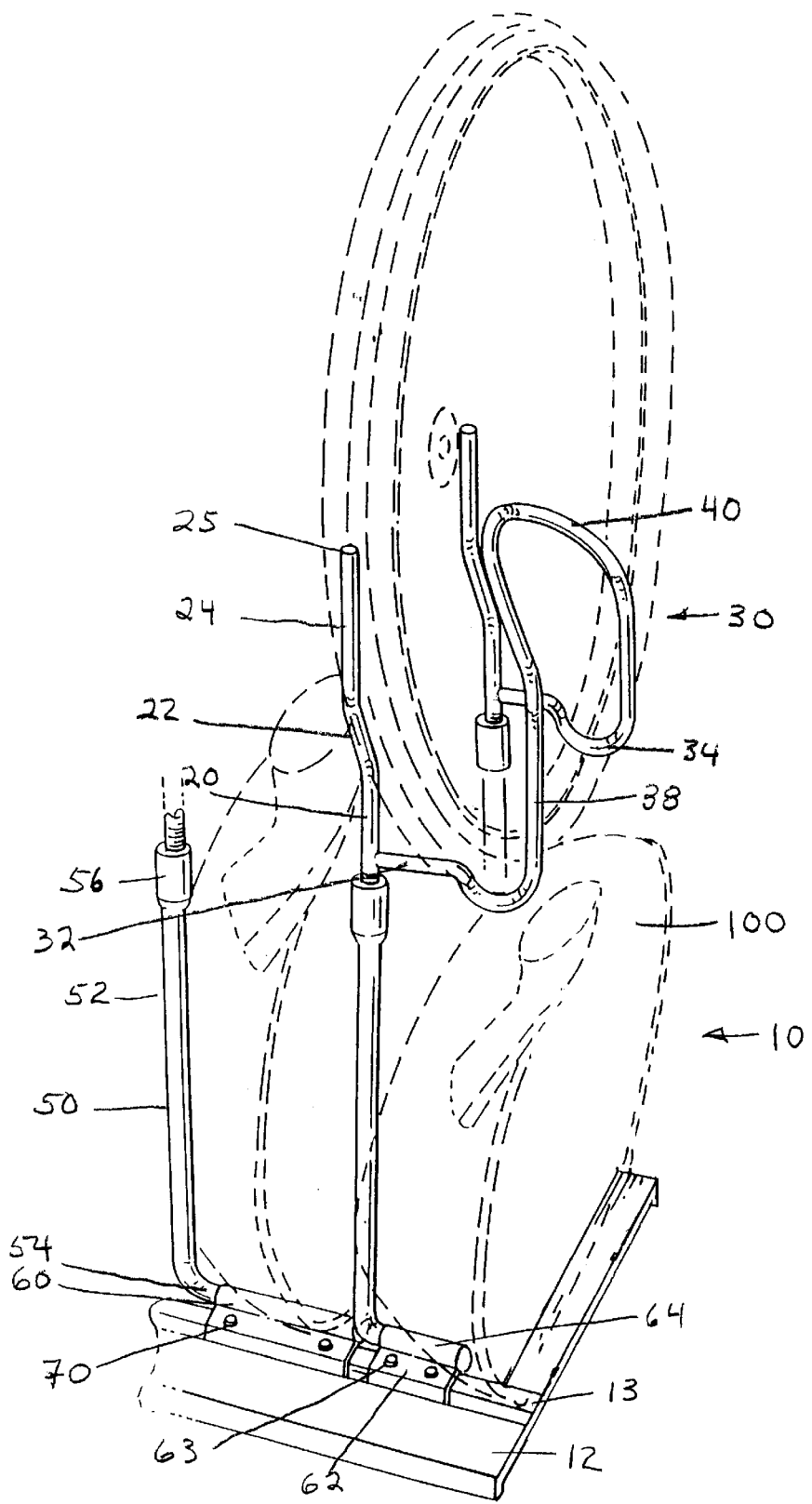
FIG. 6 is a perspective view of the wire storage rack mounted on a base with a cooking pan and lid being shown in phantom.

The preferred embodiment and best mode of the adjustable wire storage rack invention is shown in FIGS. 1–6. The storage rack 10 as shown in FIG. 6 is mounted on a block 12 for the support of pans and lids. The wire storage rack 10 is constructed with two standards or posts 14, having a lower threaded section 16 and a coated unthreaded offset section 18. The offset section 18, as seen in FIGS. 2 and 6, has an upright segment 20 which has the same axis as the lower threaded section 16, an angled segment 22 which is angled at an angle ranging from 3° to 15°, preferably 5°, from the axis of the threaded section 16 and an upper segment 24 which is parallel to the axis of the threaded section 16. The end 25 of each upper segment 24 is rounded to prevent scratching of the lids and possible injury to the user. Upright segment 20 preferably has a length of one inch, angled segment 22 a length of ¾ inches and upper segment 24 a length of two inches.

A curved lid holder member 30 is mounted to each of the standards 14 on the offset segment 18 above the threaded section 16. The curved lid holder member 30 has two legs 32, each of which extend transversely outward from the respective standard 14 at upright segment 20. Each leg 32 extends traverse to the standard and has a downward curved seating recess or configuration 34 which leads to an inverted curved "U" shaped member 36. Leg 32 preferably has a straight segment length of one inch heading to the recess 34 which has a diameter of ¾ inch, totaling 1¾ inches. The curved member 36 has straight legs 38 which are parallel to segments 20 and 24 of the offset section 18. A curved top retainer or crosspiece 40 is curved or bent backwards approximately 1 inch from the axis of legs 38 toward the offset section 18 and past recesses 34 to hold a lid 100 as shown in FIG. 6 when the lid 100 is placed into the recess seat 34. A containment area for a lid is formed by the offset standard section 18, legs 32 with recesses 34 and curved crosspiece 40. The backwardly curved crosspiece 40 is curved backwards from 20° to 40° from a vertical formed by a plane drawn between legs 38.

As previously noted, each of the angled offset upright standard sections 18 is formed with a blunt or rounded end 25 to preclude scratching of the cooking container and lids. In addition, each wire component, excepting the threaded section 16, is preferably coated with a rubber, a rubberized material or plastic coating such as PVC to prevent scratching of the cooking utensils and to protect the wires against rusting.

As is shown in FIG. 6, each of the threaded section 16 can be screwed into an "L" shaped support tube 50 which is in turn fastened to a sleeve member 60 secured to a base 12 by screws 70. The sleeve member 60 has a slide support 62 which is mounted on a rail 13 secured to or formed on base 12. A tubular sleeve 64 is secured to or integrally formed with the slide support 62 to receive and hold the support section 54 of the support tube 50. The slide support 62 is mounted to rack 13 by screws or pins 70 which are inserted through apertures 63 in the slide support 62 and fastened into rail 13. If desired, the rail 13 can be formed with pre-drilled holes to receive pins 70. The support tube 50 has an upright tubular section 52 and a support section 54 which extends transversely from the axis of the upright tubular section. A rotatable threaded nut 56 is mounted to the end of the tubular upright section 52 and can be rotated on the upright section 52 to engage the threaded section 16 allowing the standards 14 to be inserted into the upright tube section 52 to a desired height to accommodate a particular container 102 which is placed under the legs 32 of the inverted "U" shaped member.

Alternatively, two holes of substantially the same diameter as the diameter of standard sections 16 can be drilled into the planar surface (cabinet shelf, block, etc.) of a base 12 spaced apart a width equal to the distance between the centers of the standards 14 and the standard threaded portion is friction fit into the holes so that the standards support the wire rack 10. The standards are then secured into place on the base 12, with nuts securing the wire rack 10 in place on the base 12.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A wire storage rack comprising two standards, each of which has an offset section on one end and a threaded section on the other end and an inverted "U" shaped member secured to each standard forming a cross piece, said "U" shaped member being configured have a section which extends outward from said standards with another section bent back towards said standards, each offset section defining a segment which is axially aligned with said threaded section, a segment which is angled away from the axis of said threaded portion and a segment which is parallel to said threaded portion.

2. A wire storage rack as claimed in claim 1 wherein said wire storage rack is coated with a protective coating.

3. A wire storage rack as claimed in claim 1 wherein said offset segment parallel section has a rounded end.

4. A wire storage rack as claimed in claim 1 wherein said wire storage rack with the exception of said threaded portions are coated with plastic material.

5. A wire storage rack as claimed in claim 4 wherein said plastic material is polyvinylchloride.

6. A wire storage rack as claimed in claim 1 wherein said "U" shaped member is coated with plastic material.

7. A wire storage rack comprising a plurality of wire post members with a lid seating assembly mounted to and extending from each post member, said lid seating assembly comprising a lid retaining member provided with a plurality of legs, each leg being secured to a post member and extending away from said post member, each leg defining a recessed seat therein and including a section which is substantially parallel to said post members, a retaining member interconnecting said legs and forming a cross support, said retaining member being orientated away from said parallel leg section towards said standards, a tubular support member mounted to each said wire post members, each said wire post member defining a threaded section, said tubular support member defining a lumen and being provided with a rotatable threaded nut at one end adapted to receive a threaded end of said wire post members allowing insertion of said threaded section into said lumen.

8. A wire storage rack as claimed in claim 7 wherein said wire storage rack is coated with a plastic material.

9. A wire storage rack as claimed in claim 1 wherein said offset section parallel segment has a rounded end.

10. A wire storage rack as claimed in claim 7 wherein said storage rack has at least a portion coated with plastic material.

11. A wire storage rack as claimed in claim 7 wherein said retaining member has an inverted "U" shape.

12. A wire storage rack as claimed in claim 7 wherein each of said wire post members has at least one portion which is threaded.

13. A wire storage rack comprising a plurality of wire post members with an inverted "U" shaped lid seating assembly mounted to and extending from each post member, each post member defining a threaded section and an offset section, said offset section comprising a segment which is axially aligned with said threaded section, a segment which is angled away from the axis of said threaded section and a segment which is parallel to said threaded section, said "U" shaped lid seating assembly comprising a plurality of legs and a cross support member connecting said legs, each of legs is secured to a post member and has a section extending away from said post member, said leg section defining a recessed seat therein, an intermediate leg section which is substantially parallel to said post members and angled from said leg extending section and a cross support connecting said intermediate leg sections, said cross support being curved back towards said post members.

14. A wire storage rack as claimed in claim 13 wherein each said post member offset segment which is parallel to said threaded portion has a rounded end.

15. A wire storage rack as claimed in claim 13 including a tubular support member threadedly mounted to said threaded section of said wire post members, said tubular support member defining a lumen and being provided with a rotatable threaded nut at one end adapted to receive a threaded end of said wire post member allowing insertion of said wire post threaded section into said lumen.

16. A wire storage rack as claimed in claim 15 wherein said tubular support member is "L" shaped and has a base section which is adapted to be secured to a base.

17. A wire storage rack comprising a plurality of wire post members with a lid seating assembly mounted to and extending from each post member, said lid seating assembly comprising an "U" shaped wire member provided with a plurality of legs, each of said legs being secured to a post member, each leg defining a section forming a lid seat therein, said "U" shaped wire member legs having a section substantially parallel to said post members positioned adjacent to said lid seat section and a curved portion interconnecting said legs which is curved back towards said wire post members, a tubular support member threadedly mounted to each said wire post member said tubular support member being provided with a rotatable threaded nut at one end adapted to receive and hold a threaded end of said wire post members.

18. A plurality of spaced wire storage racks, each wire storage rack comprising a plurality of wire post members with a lid seating assembly mounted to and extending from each post member, each of said post members having a threaded section at one end, said lid seating assembly comprising an "U" shaped wire member provided with a plurality of legs, each of which is secured to a post member and defines a lid seat therein, each leg having a section which is substantially parallel to said post members and a curved member interconnecting said legs, said curved member being curved back towards said standards and a tubular support member threadedly mounted to each of said wire post members, said tubular support member being provided with a rotatable threaded nut at one end adapted to receive and hold a threaded end of said wire post members.

19. A wire storage rack comprising two standards, each of which has an offset section on one end and a threaded section on the other end and an inverted "U" shaped member secured to each standard forming a cross piece, said "U" shaped member being configured have a section which extends outward from said standards with another section bent back towards said standards, each offset section defining a segment which is axially aligned with said threaded section, a segment which is angled away from the axis of said threaded portion and a segment which is parallel to said threaded portion, said inverted "U" shaped member has legs which are secured to said offset portion and extend transverse to said standards, each leg defining a recessed area to seat a container lid.

20. A wire storage rack comprising a plurality of wire post members with a lid seating assembly mounted to and extending from each post member, said lid seating assembly comprising a lid retaining member provided with a plurality of legs, each leg being secured to a post member and extending away from said post member, each leg defining a recessed seat therein and including a section which is substantially parallel to said post members, a retaining member interconnecting said legs and forming a cross support, said retaining member being orientated away from said parallel leg section towards said standards, a tubular support member mounted to each said wire post members, each said wire post member defining a threaded section, said tubular support member defining a lumen and being provided with a rotatable threaded nut at one end adapted to receive a threaded end of said wire post members allowing insertion of said threaded section into said lumen, wherein each post member defines an offset section having a segment which is axially aligned with said wire post member, a segment which is angled away from the axis of said wire post member and a segment which is parallel to said wire post member.

21. A wire storage rack comprising a plurality of wire post members with a lid seating assembly mounted to and extending from each post member, said lid seating assembly comprising an "U" shaped wire member provided with a plurality of legs, each of said legs being secured to a post member, each leg defining a section forming a lid seat therein, said "U" shaped wire member legs having a section substantially parallel to said post members positioned adjacent to said lid seat section and a curved portion interconnecting said legs which is curved back towards said wire post members.

* * * * *